United States Patent [19]
Feldman

[11] Patent Number: 5,159,473
[45] Date of Patent: Oct. 27, 1992

[54] APPARATUS AND METHOD FOR PROGRAMMABLE OPTICAL INTERCONNECTIONS

[75] Inventor: Michael R. Feldman, Charlotte, N.C.
[73] Assignee: University of North Carolina, Charlotte, N.C.
[21] Appl. No.: 661,855
[22] Filed: Feb. 27, 1991
[51] Int. Cl.$^5$ .............................................. G02B 5/32
[52] U.S. Cl. ...................................... 359/1; 359/11; 359/15
[58] Field of Search .................. 359/9, 10, 11, 15, 20, 359/22, 27, 34, 559, 563, 566, 569, 107, 1

[56] References Cited

U.S. PATENT DOCUMENTS

| | | | |
|---|---|---|---|
| H738 | 2/1990 | McManus . | |
| 4,062,618 | 12/1977 | Steensma | 359/11 |
| 4,386,414 | 5/1983 | Case . | |
| 4,764,889 | 8/1988 | Hinton et al. . | |
| 4,877,297 | 10/1989 | Yeh | 359/11 |
| 4,880,286 | 11/1989 | Ih | 359/9 |
| 4,946,253 | 8/1990 | Kostuck . | |
| 4,960,311 | 10/1990 | Moss et al. | 359/9 |
| 5,004,309 | 4/1991 | Caulfield et al. | 364/822 |
| 5,040,864 | 8/1991 | Hong | 359/15 |
| 5,056,039 | 10/1991 | Caulfield | 364/822 |
| 5,068,801 | 11/1991 | Clark et al. | 364/822 |

FOREIGN PATENT DOCUMENTS

| | | |
|---|---|---|
| 143325 | 8/1980 | Fed. Rep. of Germany . |
| 54-5454 | 1/1979 | Japan . |
| 60-165601 | 8/1985 | Japan . |
| 63-208804 | 8/1988 | Japan . |

OTHER PUBLICATIONS

*Optical Signal Processing*, Spatial Light Modulators: Applications and Functional Capabilities, C. Warde and A. D. Fisher, Academic Press, Inc., 1987, pp. 477–523.
Coupled Wave Theory for Thick Hologram Gratings, H. Kogelnik, The Bell System Technical Journal, Nov., 1969, vol. 48, No. 9, pp. 2909–2947.
Optical Interconnections for VLSI Systems, J. W. Goodman et al., Proceedings of the IEEE, vol. 72, No. 7, Jul., 1984, pp. 850–866.
Formation of Optical Elements by Holography, G. T. Sincerbox, IBM Technical Disclosure Bulletin, vol. 10, No. 3, Aug., 1967, pp. 267–268.
Comparison Between Electrical and Free Space Optical Interconnects for Fine Grain Processor Arrays Based on Interconnect Density Capabilities, M. R. Feldman et al., Applied Optics, vol. 28, No. 18, Sep. 15, 1989, pp. 3820–3829.
Interconnect Density Capabilities of Computer Generated Holograms for Optical Interconnection of Very Large Scale Integrated Circuits, M. R. Feldman et al., Applied Optics, vol. 28, No. 15, Aug. 1, 1989, pp. 3134–3137.
Holograms for Optical Interconnects for Very Large Scale Integrated Circuits Fabricated by Electron-Beam Lithography, M. R. Feldman et al., Optical Engineering, Aug., 1989, vol. 28, No. 8, pp. 915–921.
Dynamic Holographics Interconnects Using Static Holograms, E. S. Maniloff et al., Optical Engineering, Mar., 1990, vol. 29, No. 3, pp. 225≧229.
Bragg Diffraction Beam Splitter for Thin Film Optical Guided Waves, K. S. Pennington et al., Optics Communications, vol. 3, No. 5, Jul., 1971, pp. 357–359.
Three-Beam Optical Detector for Magneto-Optic Storage Using Holography, IBM Technical Disclosure Bulletin, Aug., 1988, vol. 31, No. 3, pp. 12–13.
Wideband All-Optical Fiber-Optic Crossbar Switch, Diaz et al. Optical Society of America 1988 Annual Meeting Technical Digest, Oct. 30–Nov. 4, 1988, p. 79, TUG5.

*Primary Examiner*—Constantine Hannaher
*Assistant Examiner*—Edward J. Glick
*Attorney, Agent, or Firm*—Bell, Seltzer, Park & Gibson

[57] ABSTRACT

A programmable optical interconnection apparatus and method in which a plurality of spatial light modulators (SLM) form a plurality of spatially modulated beams from a data signal. A hologram is responsive to the spatially modulated beams for generating at least two destructively interfering coherent beams at a first optical detector to thereby disconnect the data signal therefrom, and for simultaneously generating at least two constructively interfering coherent beams at a second optical detector to thereby connect the data signal beam thereto. The hologram is preferably a computer generated thin hologram which does not rely on Bragg diffraction. A low cost, high density, high efficiency programmable optical interconnect is thereby provided.

37 Claims, 5 Drawing Sheets

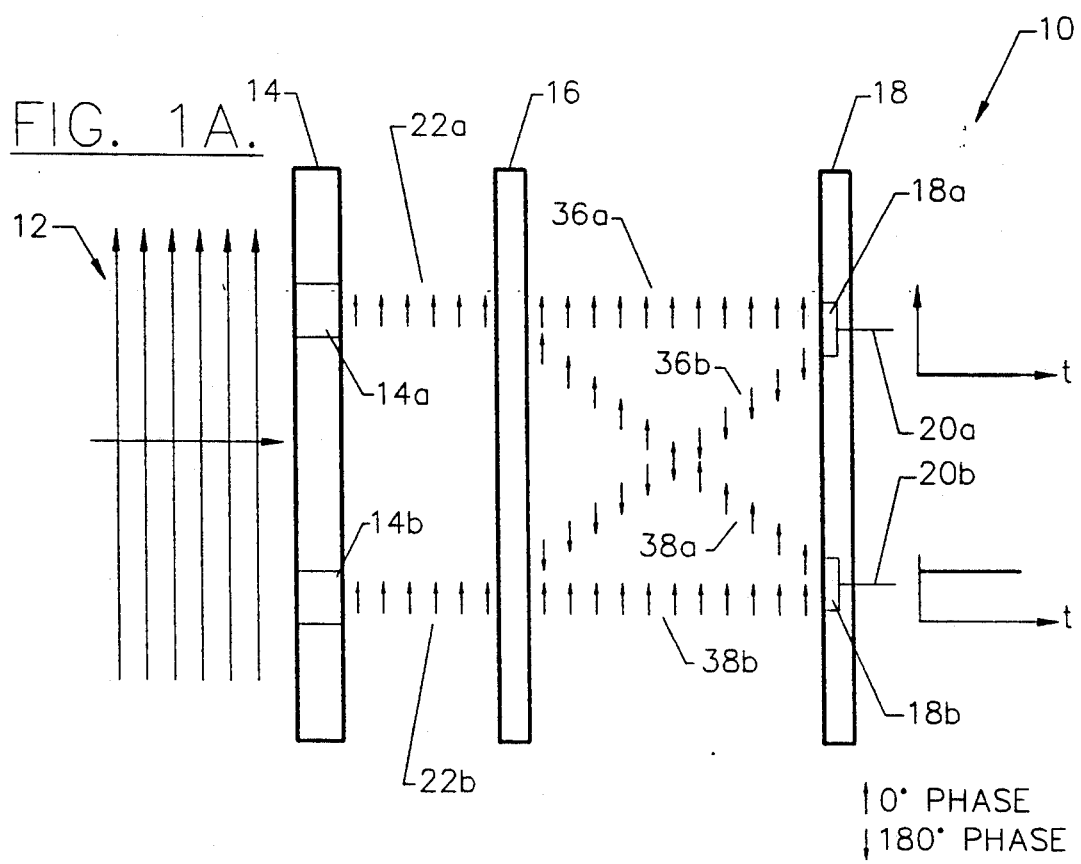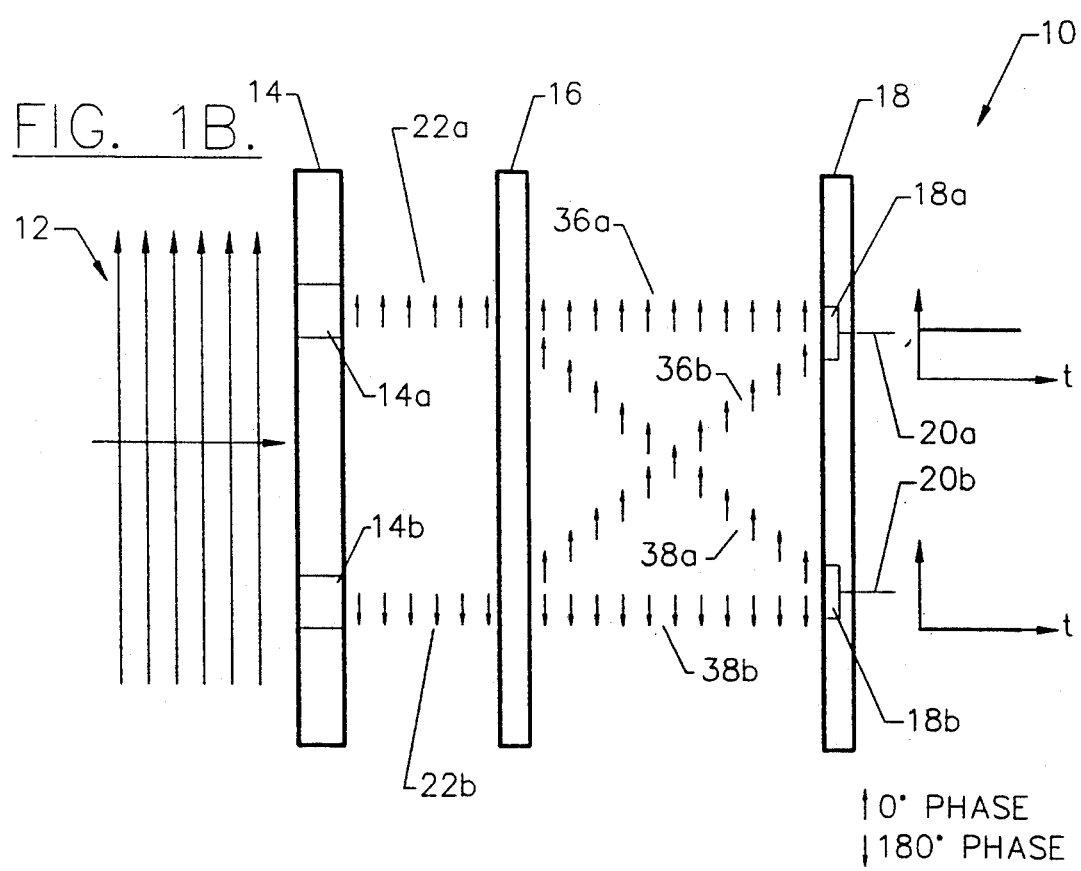

| 0° PHASE
| 180° PHASE

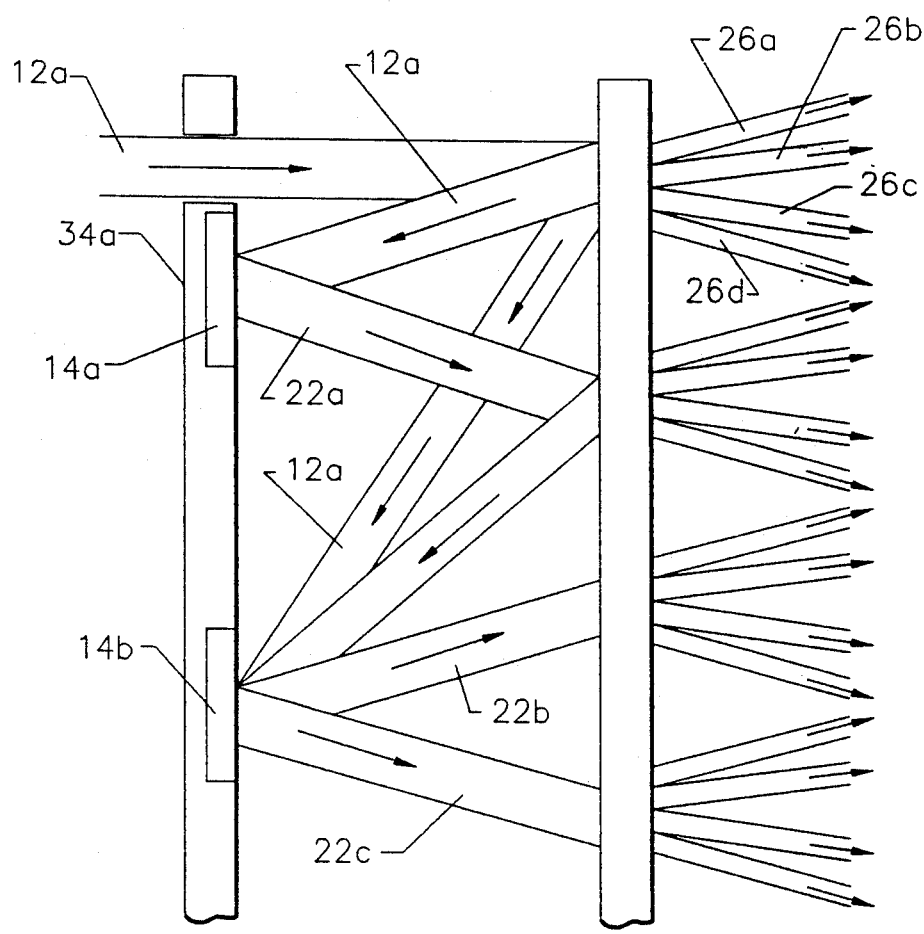
FIG. 5B.
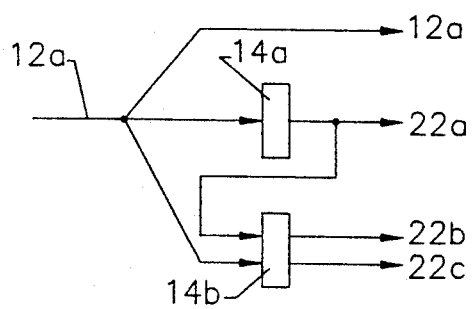
FIG. 6A.
| MODULATOR | | OUTPUT | | | |
|---|---|---|---|---|---|
| 14a | 14b | 12a | 22a | 22b | 22c |
| OFF | OFF | 1 | 1 | 1 | 1 |
| ON | OFF | 1 | 0 | 0 | 1 |
| OFF | ON | 1 | 1 | 0 | 0 |
| ON | ON | 1 | 0 | 1 | 0 |
FIG. 6B.

APPARATUS AND METHOD FOR PROGRAMMABLE OPTICAL INTERCONNECTIONS

FIELD OF THE INVENTION

This invention relates to programmable interconnections for electronic systems, and more particularly to high speed, high density programmable optical interconnections for microelectronic systems.

BACKGROUND OF THE INVENTION

State of the art electronic systems typically require high density, high speed, low loss interconnection networks. Often, programmable or reconfigurable interconnections are required, so that data may be routed or switched among large numbers of active devices. For example, high performance programmable interconnections are necessary for communication among processors in parallel processing arrays, and between chips, modules and boards in very large scale integration (VLSI) microelectronic systems. As is well known, conventional electrical interconnection systems such as electronic switching networks, are often limited in terms of speed, and density, and typically consume excessive power.

As a result of these limitations, the art has heretofore proposed using programmable optical interconnection networks instead of electronic networks. In an optical interconnection network, free space optical interconnects are substituted for electrically conductive interconnects. A comparison between electrical and optical interconnect performance may be found in a publication entitled Comparison Between Electrical and Free Space Optical Interconnects For Fine Grain Processor Arrays Based On Interconnect Density Capabilities, by inventor Michael R. Feldman et al., published on Sep. 15, 1989 in Applied Optics, Vol. 28, No. 18, page 3820-3829. Prior art approaches for programmable optical interconnections have used fiber optic elements, optoelectronic elements and/or lenses.

It has been proposed to use holograms as part of an optical interconnection network. See the above mentioned Feldman et al. publication which describes the use of a thin computer generated holographical optical element above a processing element plane to interconnect transmitters and detectors in the processing element plane. Faceted holographic optical elements may also be used. Another article by inventor Feldman et al. entitled Interconnect Density Capabilities of Computer Generated Holograms For Optical Interconnection of Very Large Scale Integrated Circuits, Applied Optics, Vol. 28, No. 15, Aug. 1, 1989, pp. 3134–3137, also describes the use of a single transmissive computer generated hologram and a reflective mirror in a double pass arrangement to form an optical interconnection. See also an article by Feldman et al. entitled Holograms For Optical Interconnects for Very Large Scale Integrated Circuits Fabricated by Electron Beam Lithography, published in Optical Engineering, Vol. 28, No. 8, August, 1989, pp. 915–921.

Other approaches for implementing optical interconnections have used holograms in combination with spatial light modulators. As is well known to those having skill in the art, a Spatial Light Modulator (SLM) may be formed of liquid crystal devices, PLZT devices, deformable mirror devices or other known devices. Spatial Light Modulators include binary phase and binary amplitude SLMs. In the binary phase SLM, an incoming light beam passes through the SLM with either zero phase shift or 180° phase shift. In other words, the phase is either unaltered or is reversed. In a binary amplitude spatial light modulator, an incoming light beam passes through the SLM in unmodified form or is blocked by the SLM. It is also known that SLMs are available as discrete SLMs or as arrays of SLMs, with each SLM in the array often being referred to as a picture element or "pixel".

A number of prior art approaches have used SLMs in combination with holograms to provide optical interconnection networks. Unfortunately, to the best of the Inventor's knowledge, prior art SLM/holographic interconnection networks have been low speed, low density, low efficiency (i.e. they dissipate excessive power), unreliable, difficult to manufacture or combinations of these undesirable characteristics.

One example of an optical interconnection network using spatial light modulators and a holographic element is described in Optical Interconnections for VLSI Systems by Goodman et al., IEEE Proceedings, Vol. 72 No. 7., July 1984, pp. 850-866. This paper describes an optical interconnection technique, in which optical inputs are connected to optical detectors with programmable patterns. Patterns are changed using a dynamic mask (SLM) to block off undesired connections. Unfortunately, if this technique is used to connect an optical transmitter to any one of N detectors, only 1/N of the incoming light power would go to the desired detector.

Yet another optical interconnection network using spatial light modulators and holograms is described in an article entitled Dynamic Holographic Interconnects Using Static Holograms by Maniloff et al., Optical Engineering, March, 1990, Vol. 29, No. 3, pp. 225-229. A two-dimensional SLM array is used to address a fixed, multi-exposure, volume hologram. As is well known to those having skill in the art a thick or volume hologram diffracts an input wave into a single diffracted wave (in addition to the transmitted wave) when the input is incident at the "Bragg angle". If the input wave has an angle of incidence away from the Bragg angle, there is no diffracted wave and the energy is contained entirely in the transmitted wave. The characteristics of thick hologram were extensively analyzed by Kogelnik in the Bell System Technical Journal, Vol. 48, No. 9, November, 1969, pp. 2909-2947, in an article entitled Coupled Wave Theory for Thick Hologram Gratings.

As described in the Maniloff et al. publication, a ferroelectric liquid crystal amplitude modulated SLM is placed between cross polarizers to operate as an intensity modulator. A message from an originator processor modulates a laser, which illuminates a horizontal one-dimensional SLM or a row of a two-dimensional SLM. The SLM spatially encodes the address of the destination processor on the incident optical wavefront which then illuminates a static, multiple exposure hologram previously recorded in the volume medium. A reference beam is reconstructed at an angle associated with the address of the destination processor. Unfortunately, the Maniloff et al. technique requires the use of a thick, volume hologram which exhibits Bragg angle selectivity, so that a single outgoing beam at the Bragg angle may be produced, to impinge on a detector. As is well known to those having skill in the art, volume holograms are typically expensive and unreliable. Moreover, in order to interconnect a large number of input beams, multiple exposures of the volume hologram must be recorded. Unfortunately, it is difficult to record multiple exposures accurately, and to prevent the multiple exposures from interfering with one another.

Thin holograms are also well known to those having skill in the art. Thin holograms may be generated by computer, as opposed to multiple exposure optical recording techniques, using well known techniques. In a thin hologram, an input wave is diffracted into numerous output waves traveling in different directions. In other words, an input plane wave is converted into multiple output plane waves. Although the thin hologram is easy to manufacture, more reliable and less lossy, it could not readily be used in the above described Maniloff et al. system because the thin hologram does not exhibit Bragg selectivity.

Yet another approach for optical interconnection networks using holograms and spatial light modulators is described in U.S. Pat. No. 4,946,253 to Kostuck entitled Reconfigurable Substrate-Mode Holographic Interconnect Apparatus and Method. Kostuck uses a light source, a spatial light modulator and multiple holograms, which may be computer generated holograms. The spatial light modulator encodes information on the light beam and the polarization modulator polarizes the light beam. The SLM is used solely to encode information onto the light beam, and polarizers and polarization sensitive holograms are used for switching the light beam. Unfortunately, for large numbers of inputs or detectors, large numbers of serially coupled polarizers and polarization sensitive holograms would be required, resulting in difficult optical alignment and low efficiency.

Another reference describing an optical interconnection system using spatial light modulators and holograms is United States Statutory Invention Registration H738 to McManus et al., entitled Switched Holograms for Reconfigurable Optical Interconnect. McManus discloses an array of optical switches, each of which is a combination of a transmission SLM and a polarizing beam splitter. A single holographic plate is positioned above the output faces of the switch array, and includes a large number of subholograms of interconnection patterns. Unfortunately, McManus requires a large number of holograms and a large number of serially coupled polarization modulators to switch an incoming optical signal to an outgoing array. For example to switch N signals with P different possible permutations, NxP hologram facets and P serially coupled polarization modulators are typically necessary.

In conclusion, the above survey indicates there is a continued need for a high speed programmable or reconfigurable optical interconnection network which uses spatial light modulators and holograms efficiently, with minimal power loss and which can be manufactured reliably and at low cost.

SUMMARY OF THE INVENTION

It is therefore an object of the present invention to provide an improved programmable optical interconnection apparatus and method.

It is another object of the invention to provide a programmable optical interconnection apparatus and method using spatial light modulators and holograms to interconnect one or more optical beams to one or more optical detectors.

It is yet another object of the present invention to provide programmable optical interconnections which may be manufactured reliably and at low cost.

It is still another object of the present invention to provide programmable optical interconnections which operate at high efficiency.

These and other objects are provided, according to the present invention, by a programmable optical interconnection apparatus in which a plurality of Spatial Light Modulators (SLM) form a plurality of spatially modulated beams from a data signal. The data signal may be an electrical data signal containing analog or digital data, or may be an incoming optical beam which is encoded with analog or digital data. A hologram is responsive to the spatially modulated beams for generating at least two destructively interfering coherent beams at a first optical detector to thereby disconnect the data signal therefrom, and for simultaneously generating at least two constructively interfering coherent beams at a second optical detector to thereby connect the data signal beam thereto.

Stated another way, for each data signal, the spatial light modulator and hologram project a plurality of coherent optical beams onto each detector. The optical beams interfere constructively at at least one detector so that the detector detects a signal. The optical beams interfere destructively at at least another detector so that no signal is detected. A single optical beam is not switched between one or more detectors. Rather, an optical beam is provided at each detector by each SLM, with the presence or absence of a detected signal being a function of whether constructive interference or destructive interference, respectively, is present at each detector.

Since the system of the present invention does not rely on Bragg diffraction to direct an optical beam to one of a plurality of detectors, a volume hologram need not be used. In fact, because the present invention requires a spatially modulated beam to be directed to multiple detectors, the multiple angle property of a thin hologram is preferably used. Accordingly, at least two spatial light modulators are used to simultaneously spatially modulate a data signal to create a predetermined wavefront therefrom, with the predetermined wavefront being encoded with the data signal. The predetermined wavefront is directed to a thin hologram, for producing an interconnection between the data signal and at least one detector.

Since thin holograms may be computer generated at low cost using well known techniques, a low cost system may be provided. Moreover, since the present invention allows the input signal to be distributed to many detectors, minimal power is wasted. A high efficiency system is thereby provided. Finally, because only a small number of modulators are required per switching node, a high density system may be provided. The system can support programmable one-to-one, as well as one-to-many and many-to-one interconnections.

According to a particular embodiment of the present invention, an optical beam generator generates an optical beam. A plurality of spatial light modulators are responsive to the optical beam for forming a plurality of coherent spatially modulated beams therefrom. Holographic means, preferably a computer generated thin holographic optical element, is responsive to the plurality of coherent spatially modulated beams. The thin hologram generates at least two destructively interfering coherent beams at a first optical detector, to thereby disconnect the optical beam therefrom. The thin hologram simultaneously generates at least two constructively interfering coherent beams at a second optical detector, to thereby connect the optical beam thereto.

The holographic element directs at least two of the spatially modulated beams to each of the optical detectors to cause destructive interference among the spatially modulated beams at a first optical detector and to simultaneously cause constructive interference among the spatially modulated beams at a second optical detector. The holographic element may be designed analytically or by iterative encoding methods such as Iterative Discrete On-Axis (IDO) encoding. Accordingly, the spatial light modulators provide the switching capability and the thin hologram provides the high spatial frequency necessary to produce highly efficient, high performance connections. The spatial light modulators may be amplitude SLMs or phase SLMs. Transmissive and/or reflective SLMs may be used. The SLMs may be used to spatially modulate an optical beam which itself is modulated with a data signal. Alternatively, the SLM's may encode an optical signal on an optical beam, as well as spatially modulate the beam, for programmable interconnection.

According to the method of the present invention, a data signal is connected to a plurality of optical detectors by converting the data signal into a plurality of coherent optical beams, and then simultaneously generating, from the plurality of coherent optical beams, at least two destructively interfering coherent beams at a first optical detector and at least two constructively interfering coherent beams at a second optical detector. The destructively interfering coherent beams disconnect the data signal from the first optical detector, and the constructively interfering coherent beams connect the data signal to the second detector.

BRIEF DESCRIPTION OF THE DRAWINGS

FIGS. 1A and 1B schematically illustrate a first embodiment of a programmable optical interconnection apparatus according to the present invention.

FIG. 5B schematically illustrates one of the processing elements of FIG. 5A.

FIGS. 6A and 6B schematically illustrate Hamming code which may be used with the system of FIG. 5.

DESCRIPTION OF A PREFERRED EMBODIMENT

Figure 2A:
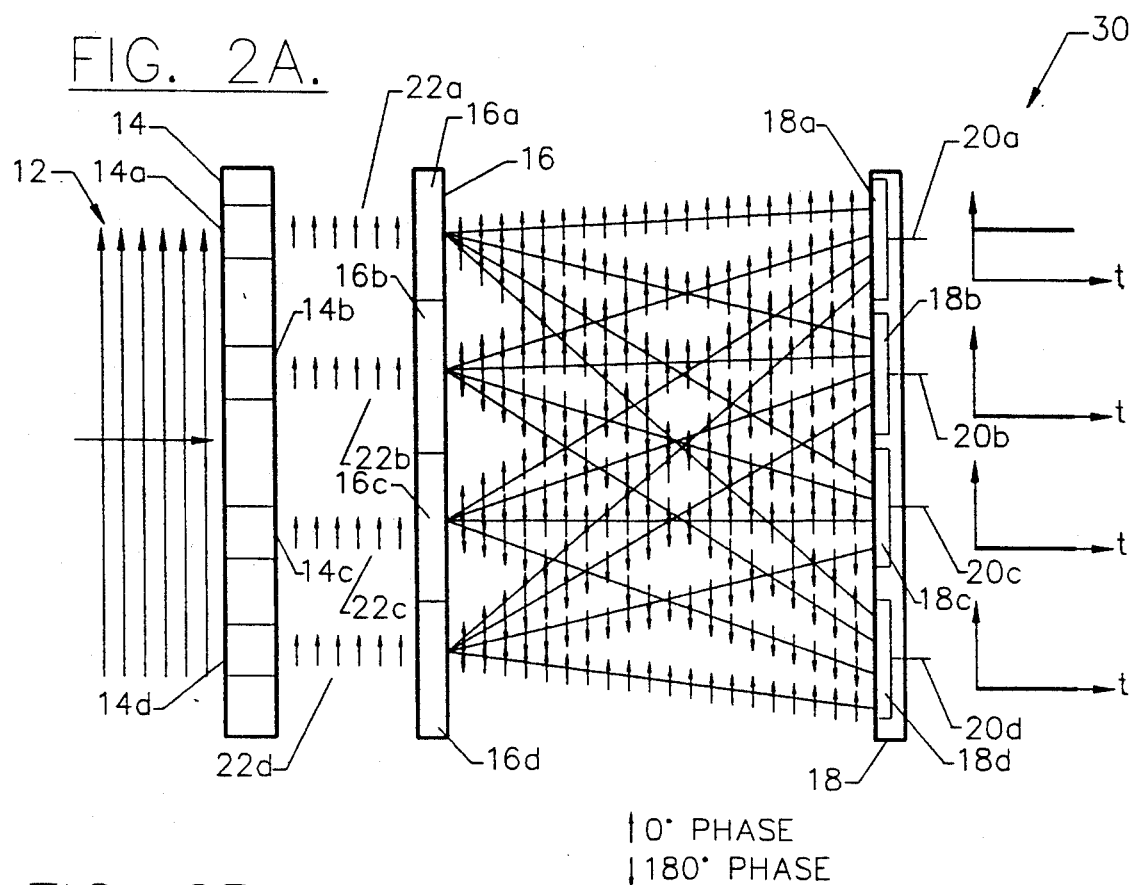
FIG. 2A schematically illustrates a second embodiment of a programmable optical interconnection apparatus of the present invention.

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Referring now to FIGS. 1A and 1B, a simplified version of the present invention will now be described. As shown in FIGS. 1A and 1B, a single incoming optical beam is connected to one of two optical detectors. Although real-world programmable interconnections typically must switch large numbers of optical signals to large numbers of optical detectors, the embodiment of FIGS. 1A and 1B are instructive for describing the manner of generating constructive interference or destructive interference of multiple beams at each optical detector, according to the invention.

Referring now to FIG. 1A, optical interconnection apparatus 10 switches an incoming optical beam 12, which impinges on Spatial Light Modulator array 14, to one of two optical detectors 18a, 18b to produce a signal on lines 20a, 20b. It will be understood by those having skill in the art that optical beam 12 is typically a coherent optical beam produced by a laser or other coherent optical source. The optical beam 12 may be encoded with a digital or analog data signal. Alternatively, a data signal may be encoded on optical beam 12 by the SLM array 14. Detectors 18 are typically phototransistors or other well known detectors Which produce an electrical signal (typically voltage or current) in response to optical energy impinging thereon.

A spatial light modulator array 14 is positioned relative to the optical beam 12 so that the optical beam impinges thereon. As shown in FIG. 1A, a pair of spatial light modulators 14a and 14b are included in the array. In the embodiment shown in FIG. 1A spatial light modulators 14a and 14b are binary phase spatial light modulators. In other words, when the spatial light modulator is off (not activated), it transmits the incoming light therethrough with no phase change. When the spatial light modulator is on (activated) it inverts the phase of the incoming beam so that an outgoing beam 180 out of phase is produced. For purposes of illustration, in FIGS. 1 and 2, upward pointing arrows indicate 0° phase and downward pointing arrows indicate 180° phase. As shown in FIG. 1A, the spatial light modulator array 14 produces a pair of spatially modulated beams 22a, 22b, from the incoming beam 12. Preferably, spatially modulated beams 22a, 22b are coherent With one another.

Still referring to FIG. 1A, holographic means, preferably a computer generated thin holographic element 16, is positioned relative to the spatially modulated beams 22 such that the spatially modulated beams 22a, 22b impinge thereon. Holographic element 16 is designed to direct each of the spatially modulated beams 22a, 22b to each of the detectors 18a, 18b either with or without phase inversion. As illustrated in FIG. 1A, hologram 16 directs beam 22a to detectors 18a and 18b without phase inversion. Hologram 16 also directs beam 22b to detector 18a with phase inversion and to detector 18b without phase inversion. The design of a computer generated hologram to produce the pattern of beams shown in FIG. 1A is well known to those having skill in the art and need not be described further herein. However, it will be noted that hologram 16 is particularly suitable to be implemented as a thin, computer generated hologram which can direct an incoming beam to more than one outgoing location. Moreover, by using a thin computer generated hologram, low cost and reliable programmable interconnections may be obtained.

Still referring to FIG. 1A, it may be seen that a pair of destructively interfering coherent beams 36a, 36b impinge on detector 18a while a pair of constructively interfering coherent beams 38a, 38b impinge on detector 18b. Thus, a signal will appear on line 20b and not on line 20a. It will be understood by those having skill in the art that since the constructively interfering signal appearing at detector 18b is formed by the combination of two beams, the power in the incident optical beam 12 may be transmitted to detector 18b with minimal power loss.

Referring now to FIG. 1B, the mechanism for switching the incoming beam 12 from detector 18b to detector 18a will now be illustrated. As shown, phase spatial light modulator 14a is still not activated so that the incoming beam passes therethrough without phase change. However, phase spatial light modulator 14b is now activated to invert the phase (180° phase change) of the incoming beam 12. Thus, beam 22b now has inverted phase (downward arrows). Since hologram 16 is designed to invert the phase of incoming beam 22b at detector 18a and not to invert the phase of incoming beam 22b at detector 18b, the pair of beams 36a, 36b at detector 18a constructively interfere and the pair of beams 36a, 36b at detector 18b destructively interfere. Accordingly, the detected signal will now appear on line 20a and not on line 20b. As shown, not all of the pixels in the hologram need to be programmable. Rather, only a small number of pixels in the hologram may need to be programmable. Since only a small number of modulators with large pixel dimensions may be required, the switching energy, reconfiguration time, power dissipation and cost may be reduced.

To summarize, according to the invention, the signal at each detector is formed by constructive or destructive interference from a plurality of signals impinging thereon. Preferably, the present invention does not switch signals to one or more detectors by directing an incoming beam from the undesired detector to the desired detector. Rather, the incoming beam is directed to all detectors, with constructive or destructive interference at each detector determining which detector is activated. Accordingly, if all of the light at the exit of the hologram, which originates from all SLMs except for one SLM, is blocked, (for example, beams 36a and 38a are blocked) more detectors will be activated because there would be less destructive interference. This contrasts with prior art approaches in which blocked light on the exit surface of the hologram will not cause more detectors to be activated.

Figure 2B:
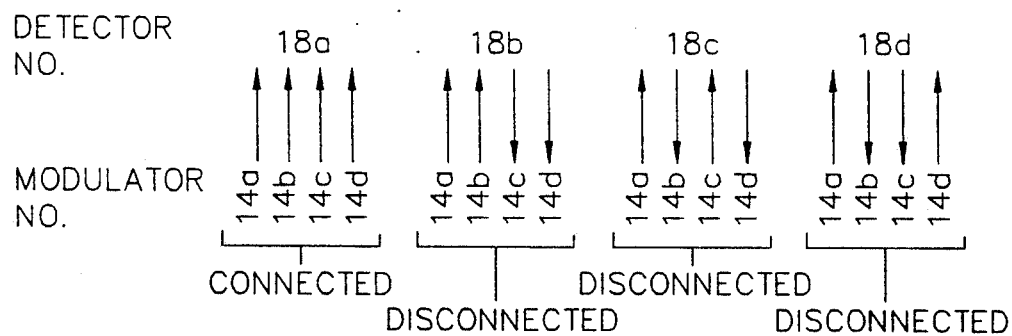
FIGS. 2B and 2C illustrate patterns of constructive and destructive interference at the detectors of FIG. 2A.
Figure 2C:
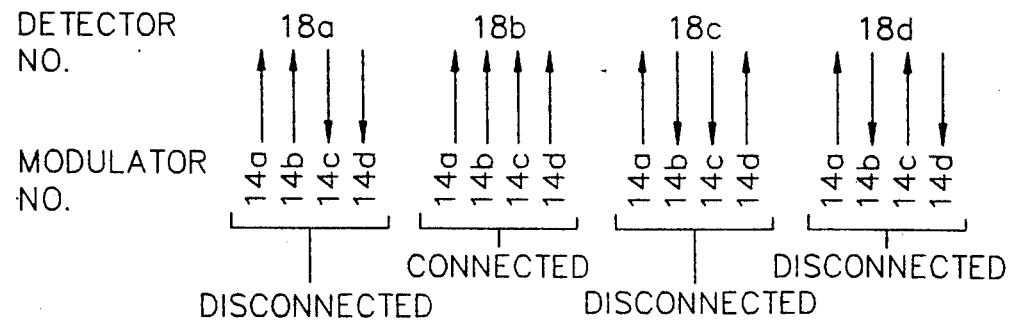

Referring now to FIGS. 2A-2C a programmable optical interconnect for connecting an optical beam to one of four optical detectors according to the present invention will now be described. As shown, four spatial light modulators 14a-14d are provided, to generate four spatially modulated beams 22a-22d. As with FIG. 1, phase spatial light modulators are shown, however amplitude spatial light modulators may also be used. In FIG. 2A, a faceted computer generated hologram 16 is illustrated. The computer generated hologram is divided into facets 16a-16d so that light passing through each modulator 14a illuminates a distinct facet 16a-16d. As shown, each facet of the hologram 16 generates a beam at each of the four detectors 18a-18d. At each detector, destructive or constructive interference is created to thereby disconnect or connect, respectively, the optical beam 12 from the associated detector 18a-18d.

With the system described in FIG. 2A, each optical beam or transmitting node 12 may be programmably connected to any one of N receiving nodes or detectors 18 with low insertion loss and N modulators 14 per transmitting node. It will be understood by those having skill in the art that the faceted computer generated hologram theoretically simplifies the hologram design, because there is no interaction or overlap among modulated beams 22a-22d. However, if there is interaction among the beams, known techniques for fabricating computer generated holograms can compensate for this overlap to direct each of the beams 22a-22d to each of detectors 18a-18d as desired.

As further shown in FIG. 2A, facet 16a of hologram 16 directs beam 22a to each of detectors 18a-18d without phase inversion (0° phase, upward pointing arrow). Facet 16b directs a 0° phase beam to detectors 18a and 18b and a 180° phase beam to detectors 18c and 18d. Facet 16c directs a 0° beam to detectors 18a and 18c and a 180° beam to detectors 18b and 18d. Finally, facet 16d directs a 0° phase beam to detectors 18a and 18d and a 180° phase beam to detectors 18b and 18c. Accordingly, as illustrated in FIG. 2A, when none of spatial light modulators 14a-14d are activated, constructive interference is created at detector 18a to thereby produce an optical signal at 20a, and destructive interference is created at each of the other detectors 18b-18d so that no signal is detected thereat. This operation is illustrated schematically in FIG. 2B. Accordingly, if one unit of optical power illuminates each modulator 14a-14d, detector 18a will receive four units of optical power while the other detectors will receive no incident optical power.

Referring now to FIG. 2C, activating modulators 14c and 14d to thereby change the phase of beams 22c and 22d by 180° results in constructive addition of the vectors at detector 18b and destructive addition at the other three detectors. Accordingly, by choosing to activate different combinations of two detectors, all of the light can be effectively focused on any one of the four receiving detectors 18a-18d.

It will also be understood by those having skill in the art that if only one modulator 14 is activated, each detector receives only one quarter of the incident optical power. This mode can be used, for example, for transmitting a logical ZERO to all detectors or for broadcasting a signal to all detectors, depending on the threshold settings of the detectors. If a broadcast mode is chosen, then a fifth modulator may be needed to allow a logical ZERO to be sent to all detectors.

It will also be understood by those having skill in the art that if the logical value "1" is assigned to each activated modulator 14 and a "0" to each inactivated modulator, then any sequence of active and inactive modulators may be represented by a Boolean code word of N bits, where N is the number of modulators associated with each transmitting mode. Accordingly, the example of FIGS. 2A-2C corresponds to addressing the modulators with a 4-bit Boolean code such that the Hamming distance (i.e. the number of bits that differ between two code words) is exactly two bits between any code words. In general, M detectors may be addressed with M modulators with an M/2 Hamming distance, M-bit code, with 100% theoretical diffraction efficiency (i.e. no insertion loss) and infinite theoretical signal to noise ratio (i.e. no crosstalk). It will also be understood by those having skill in the art that by allowing more than one Hamming distance between code words, a larger number of detectors can be addressed at the expense of a finite signal to noise ratio and/or less than 100% diffraction efficiency. For example, a code sequence containing Hamming distances of M/2 and M/4 bits between code words can allow M modulators to address $M^2/4$ receiving nodes with an insertion loss of $\sqrt{M}/3$.

Figure 3:
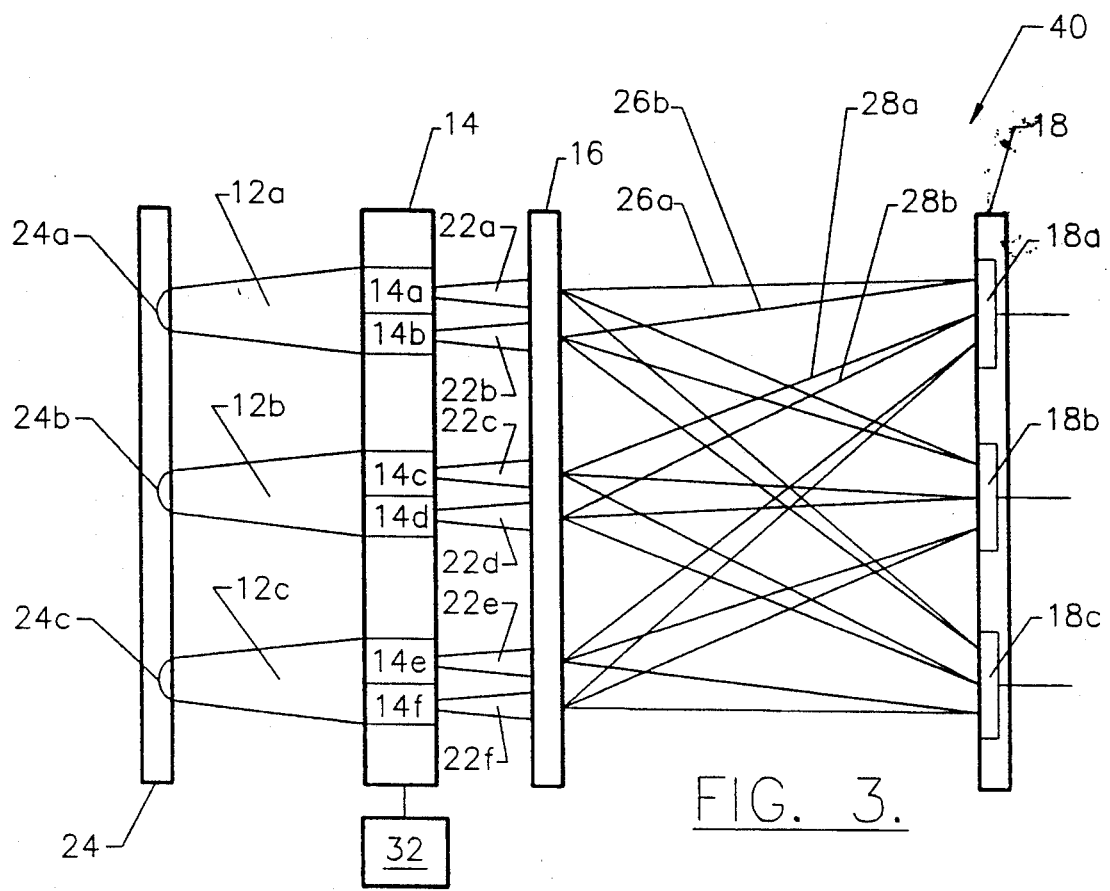
FIG. 3 schematically illustrates a third embodiment of a programmable optical interconnection apparatus according to the present invention.

Referring now to FIG. 3, an optical interconnection apparatus for connecting a plurality of optical beams to a plurality of detectors according to the invention will now be described. As shown in FIG. 3, a plurality of transmitters 24a–24c, which may be lasers, spatial light modulators or light emitting diodes, produces three optical beams 12a–12c. Each optical beam may be thought of as a separate signal in a digital system such as a parallel processing computer system. The combination of the SLM array 14 and the computer generated hologram 16 controls which of three detectors 18a–18c each of the signals is to be routed. For ease of illustration, the 0° phase and 180° notations have not been shown.

Still referring to FIG. 3, it can be seen that spatial light modulators 14a–14f produce modulated beams 22a–22f. Each beam produces a beam at each of detectors 18a–18c via hologram 16. At any detector, the phase relationship between the beams produced thereat by a pair of spatially modulated beams 22a–22b, 22c–22d, or 22e–22f, determines whether or not a signal is detected.

It will be understood by those having skill in the art that in order to maintain distinctness among transmitters 24a–24c, the signals arriving at a given detector from a particular transmitter are preferably coherent to one another, but the signals arriving at a particular detector from different transmitters are preferably incoherent from one another. In other words, beams 26a and 26b are preferably coherent to one another so that they can constructively or destructively combine at detector 18a. Similarly, beams 28a and 28b are preferably coherent to one another so that they can constructively or destructively combine at detector 18a. However, beams 26 are preferably incoherent with respect to beams 28 so that they do not cause destructive or constructive interference with one another. Accordingly, the signals from optical sources 24a–24c may each be kept distinct.

It will also be understood by those having skill in the art that FIGS. 2 and 3 represent an "externally controlled" programmable interconnection. In an externally controlled connection, the programming of the interconnect is performed by an external controller 32 which is connected to the SLMs 14, and this external control may be independent of the signal modulation of transmitters 24a–24c. Examples of practical applications which use external control include fiber optic crossbar switch networks, and crossover and butterfly networks for interconnecting logic gates to perform Fast Fourier Transforms. It will also be understood that an externally controlled programmable interconnection may be used to scan a laser beam across rows of an optical disk in an optical disk player, recorder, or memory. In that case, detectors 18 of FIG. 2 may be replaced by the surface of an optical media.

Figure 4:
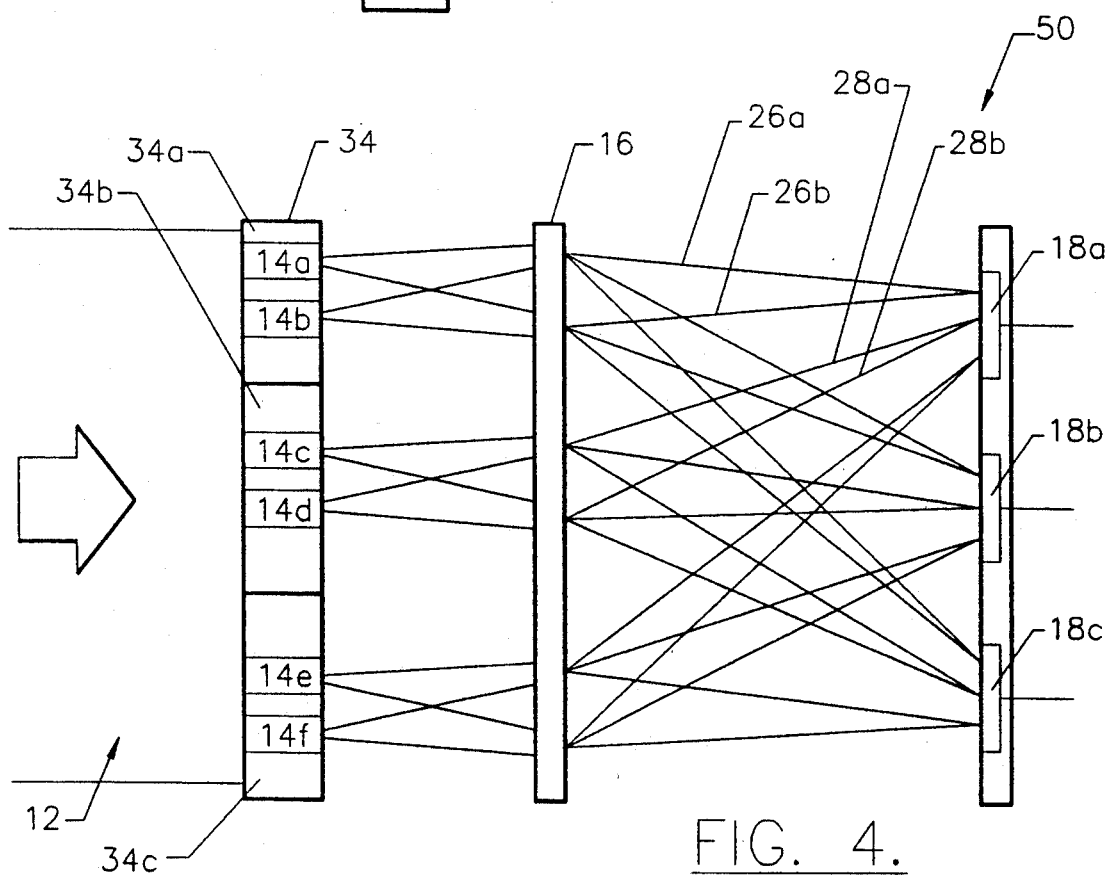
FIG. 4 schematically illustrates a fourth embodiment of a programmable optical interconnection apparatus according to the present invention.

Referring now to FIG. 4, a "locally controlled" programmable interconnection 50 will now be described. In locally controlled programmable connections, the particular connection to be implemented is determined locally by a processing element 34. Locally controlled programmable interconnections may be used in parallel processing applications, where each processing element 34 calculates data and also routes the data to another processor.

As shown in FIG. 4, spatial light modulators 14 are incorporated into the individual processing elements 34. Each processing element may calculate data and may activate the appropriate SLM 14 to produce the desired connection pattern. Thus, the SLMs associated with a given processing element in FIG. 4 act as both a data signal transmitter (emitting logical 1 or a logical 0 signals) and as part of the programmable connection network (determining which detector is to receive the signal). It will be understood that in a typical microelectronic implementation of processing elements, the SLMs of one processing element, e.g. SLMs 14a and 14b of processing element 34a, are typically separated by a small distance (on the order of 25 μm), thereby maintaining beam coherence, while the SLMs of adjacent processing elements, e.g. SLMs 14b and 14c, are separated by much larger distances (on the order of 2 mm–5 cm) to maintain incoherence. As already described, activation of different combinations of modulators will produce different wavefronts in the plane immediately in front of the hologram 16, which wavefronts combine with the hologram to cause constructive or destructive interference at the detectors 18. As also already described, phase or amplitude SLMs may be used.

It will be understood by those having skill in the art that if collimating optics are used, or if the divergence angles of the beams are small, then the holographic systems of FIG. 3 and FIG. 4 may produce the same connection patterns for the same SLM patterns and holograms 16 if the modulators in FIG. 4 were spaced far enough apart so that the beams do not overlap. The embodiments of FIGS. 3 and 4 may be contrasted, however, because in FIG. 3 only one optical signal 24a–24c need be incorporated into each transmitting node, but an additional SLM plane 14 is required. In FIG. 4 although no external SLM plane 14 is needed, several modulators must be incorporated into each transmitting node.

Referring now to FIG. 5, a programmable optical interconnection according to the present invention, using a reflective hologram, will now be described. According to the invention, the number of modulators and the power dissipation thereof may be greatly reduced using a multiple pass arrangement with a reflective computer generated hologram. In this arrangement, an optical beam undergoes multiple reflections between the hologram and the spatial light modulators before transmission to the detectors. In this manner, a small number of modulators may be used to generate N optical signal beams with phase relationships corresponding to an N/2 distance Hamming code sequence. Once the signal beams with the Hamming code phase relationships have been generated, these signal beams may be directed to the detectors using a faceted or unfaceted computer generated hologram as already described. Since the Hamming distance between the code words is N/2, an optical signal can be transmitted to any one of N detectors with no theoretical crosstalk or insertion loss.

Figure 5A:
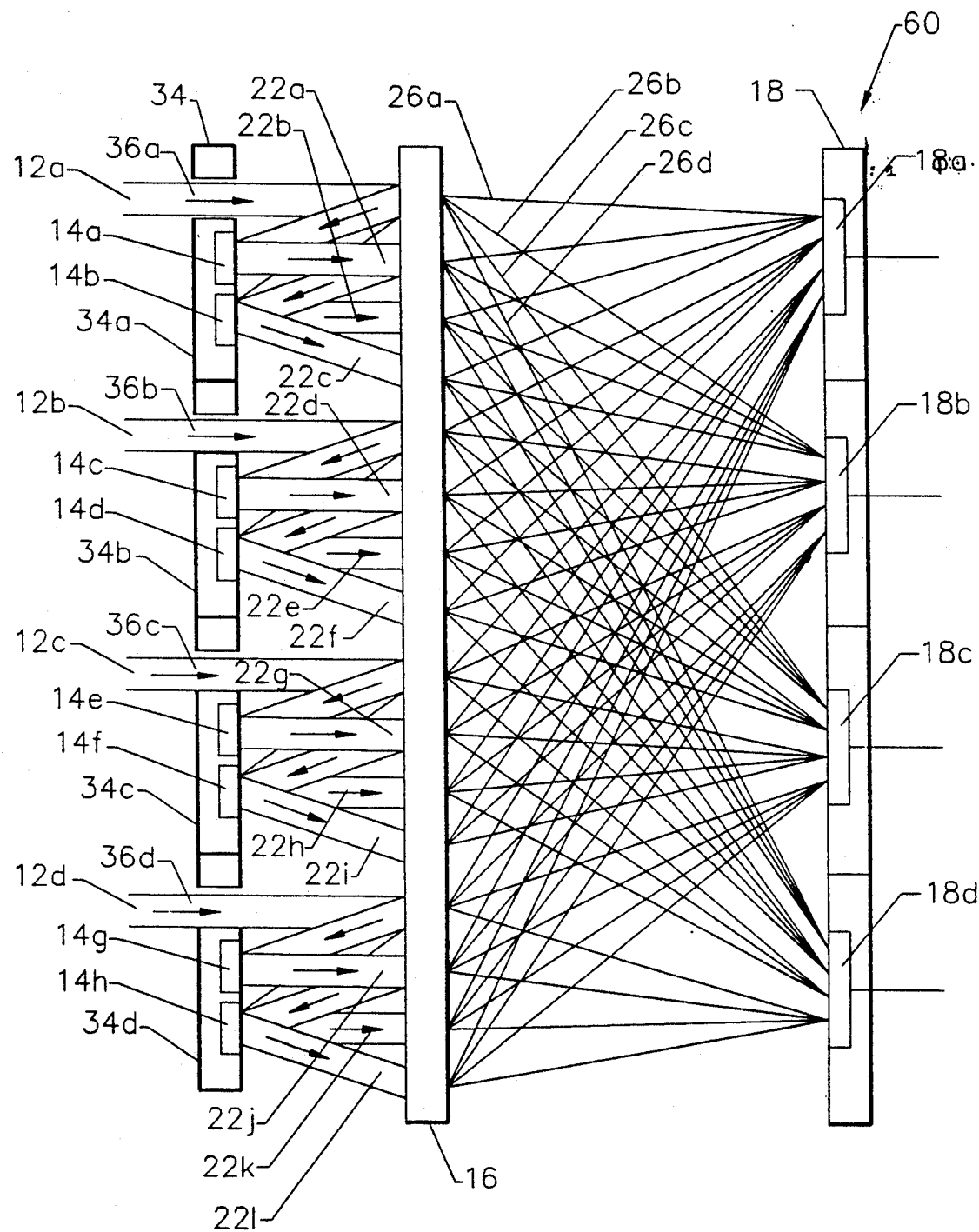
FIG. 5A schematically illustrates a fifth embodiment of a programmable optical interconnection apparatus according to the present invention.

Referring now to FIG. 5A, the programmable optical interconnection system 60 includes a plurality of optical beams 12a–12d. Each optical beam passes through a respective aperture 36a–36d in a processing element 34a-34d. It will be understood by those having skill in the art that laser diodes or other optical sources may also be mounted on the individual processing element substrate to generate beams 12a-12d without the need for apertures in the processing elements. As also shown, each processing element 34 includes a pair of spatial light modulators 14 as already described in connection with FIG. 4. As shown in detail in FIG. 5B, the light from an external source successively propagates between the hologram 16 and the SLMs 14. In this manner, two SLMs may be used to generate four signal beams. The combined interaction of these four signal beams results in focusing of the optical signal onto one of the four detectors 18a-18d. The path difference between different beams within a processing element may be minimized using techniques well known to those having skill in the art. FIG. 5B is an enlarged view of the first processing element 34a and the computer generated hologram 16 in the vicinity thereof to illustrate the manner to which the signal successively propagates between the hologram and the spatial light modulators.

A particular N/2 distance Hamming code may be used with the system of FIG. 5, which requires M SLMs per beam 12, and requires P round trip traversals between the hologram 16 and the processing SLM 14, where $$M = P[(N)^{1/P} - 1].$$

A particular example for P=2, N=4 and M=2 is illustrated in FIG. 6A. The number of modulators is minimized for P=log N, for which only log N modulators are needed. As is well known to those having skill in the art, this is a theoretical lower bound on the number of modulators required to form a connection between a transmitting node and any one of N receiving nodes. It will noted however, that if the diffraction efficiency of each subhologram is $\eta_S$, the total diffraction efficiency after log N traversals between the hologram and the processing element is $$(\eta_S)^{log N},$$

because the signal beam is diffracted by a subhologram on each traversal. In order to reduce this optical power loss, a larger number of modulators may be used. For example, by incorporating $N^{\frac{1}{4}}$ modulators into each node, each optical signal beam will consecutively pass through four subholograms independent of N.

FIG. 6B illustrates how the two binary phase modulators 14a-14b and a hologram may be used to divide an input signal beam 12a into four output signal beams 22a, 22b and 22c, such that the phase relationships between these beams correspond to a Hamming code with a Hamming distance of 2. In FIG. 6B a value of 1 indicates a phase of 0° while a value of 0 indicates a phase of 180°. Thus, through interference effects, these four signal beams can be combined by a hologram so that the light constructively interferes onto any one of four locations and destructively interferes at the other three. It will be understood that, for purposes of clarity, the holograms which may be needed to provide a signal fan out and a feedback path from output 22a to modulator 14b are not shown in FIG. 6A.

The embodiments of FIGS. 2, 3, 4 and 5 will now be compared. If the faceted holographic element of FIG. 2A is used to implement an NxN crossbar switch, each of N communications ports can communicate simultaneously with any other port, with the total power dissipation proportional to N, total number of modulators proportional to $N^2$, one communication time step, and infinite theoretical signal to noise ratio. This should be compared to a conventional amplitude SLM crossbar that requires power dissipation proportional to $N^2$ and a total number of modulators proportional to $N^2$. Alternatively, if a power dissipation of $N^{3/2}$ can be tolerated, the number of modulators in the faceted embodiment of FIG. 2A can be reduced to be proportional to $N^{3/2}$ by using a code sequence with Hamming distances of both N/2 and N/4. Accordingly, for example, 1024×1024 crossbar switch may be implemented with only 64,000 modulators (i.e. a 256×256 SLM array), and a power requirement of 10,000 times the threshold power of a single detector. This should be compared to the 1,024,000 modulators and a power requirement of 1,024,000 times the detector threshold power that is needed in a conventional amplitude SLM approach. This improvement becomes more dramatic as the size of the crossbar increases.

The number of modulators can be reduced to an even greater extent by using the multipass architecture illustrated in FIG. 5. This architecture allows for arbitrary permutations of N signals with a total power dissipation proportional to N, a number of modulators per node proportional to $PN^{1/P}$, where P is the number of traversals between the hologram and processing element, and one communication time step and infinite theoretical signal to noise ratio. For the case of P=log N, each of these parameters is within a constant factor of fundamental minimum theoretical values, but the insertion loss due to non-ideal holograms and/or detectors may be prohibitively high for large N. For P=4, the number of modulators per node must be increased to be proportional to $N^{\frac{1}{4}}$, but the insertion loss becomes independent of N even for non-ideal holograms and modulators. For some applications a disadvantage of this approach may be the large area occupied by the subholograms.

All of the embodiments heretofore disclosed have used binary phase spatial light modulators. However, the invention may also be implemented using amplitude spatial light modulators. Since two binary amplitude SLMs combined with a hologram can be used to simulate a single binary phase SLM, the binary phase SLM programmable interconnect systems of FIGS. 1-5 can be converted to amplitude SLM systems using the same code sequences, by including twice the number of SLMs. Accordingly, the power requirements are increased by a factor of two for the single pass system and a factor of $2^P$ for the multiple pass system of FIG. 5. Exactly one half of the amplitude modulators associated with each node are activated at any given time. Alternatively, by allowing activation of less than one half of the modulators associated with each node, the number of modulators per node can be reduced at the expense of increased power dissipation.

It will understood by those having skill in the art that the total hologram area as well as the number of traversals in the reflective approach of FIG. 5 may be reduced by using more complicated interconnect structures between the hologram and SLM. For example, allowing the light from different SLMs to overlap on the hologram would increase the connection density capacity but would require more complicated codes for SLM activation. These codes may be readily obtained by those having skill in the art during fabrication of the computer generated hologram, using iterative methods such as simulated annealing and modifications of the iterative discrete on-axis computer generated hologram encoding method. It will also be understood by those having skill in the art that multilayer structures containing multiple layers of holograms and/or SLMs separated by thin buffer layers may be used. The use of multiple layers may further increase the system connection density capacity. Also, the use of q-phase level modulators, with q being greater than 2, will allow for the number of modulators and power requirements to be reduced to an even greater extent.

Finally, it will also be understood by those having skill in the art that the number of modulators, power requirements and in some cases the switching energy of the system may also be reduced by incorporating time multiplexing. This can be achieved, for example, by restricting the number of nodes that can be directly connected to a transmitting node and using message passing communication, or by allowing only a subset of the transmitting nodes to be active simultaneously. For example, a time-multiplexed crossbar may be implemented without message passing or additional routing circuitry with $2\sqrt{N}/p$ modulators per node, by dividing each communication step into P time steps and using the single pass faceted system of FIG. 2. Alternatively, the same single pass approach may be used to implement a two-dimensional nested crossbar connection network in which each node is connected to the $\sqrt{N}$ other nodes such that the maximum distance between any 2 nodes is 2, using one detector per node and $N^{\frac{1}{2}}$ transmitters per node.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An optical interconnection apparatus, comprising:
   a first optical beam generator, for generating a first optical beam;
   a plurality of optical detectors;
   a plurality of spatial light modulators, responsive to said first optical beam, for forming a first plurality of spatially modulated beams therefrom; and
   holographic means, responsive to said first plurality of spatially modulated beams, for generating destructively interfering beams at a first one of said optical detectors to thereby disconnect said first optical beam therefrom, and for simultaneously generating constructively interfering beams at a second one of said optical detectors to thereby connect said first optical beam thereto.

2. The apparatus of claim 1 wherein said holographic means comprises a thin hologram.

3. The apparatus of claim 2 wherein said thin hologram comprises a computer generated thin hologram.

4. The apparatus of claim 3 wherein said computer generated thin hologram comprises a faceted computer generated thin hologram.

5. The apparatus of claim 1 wherein each of said plurality of spatial light modulators comprise binary phase spatial light modulators.

6. The apparatus of claim 1 further comprising electronic controlling means, operatively connected to said plurality of spatial light modulators, for causing said spatial light modulators to generate predetermined patterns of said first plurality of spatially modulated beams, said holographic means being responsive to a first predetermined pattern of said first plurality of spatially modulated beams to disconnect said first optical beam from said first optical detector and to connect said first optical beam to said second optical detector.

7. The apparatus of claim 1 wherein each of said plurality of spatial light modulators comprise transmissive spatial light modulators.

8. The apparatus of claim 1 wherein each of said plurality of spatial light modulators comprise reflective spatial light modulators, said holographic means and said reflective spatial light modulators cooperating to form said first plurality of spatially modulated beams.

9. The apparatus of claim 1 wherein said holographic means generates one of constructively interfering beams and destructively interfering beams at each of said plurality of optical detectors.

10. The apparatus of claim 1 further comprising a second optical beam generator for generating a second optical beam, said plurality of spatial light modulators forming a second plurality of spatially modulated beams from said second optical beam, said holographic means being responsive to said second plurality of spatially modulated beams independent of said first plurality of spatially modulated beams, for generating destructively interfering beams at said second one of said optical detectors to thereby disconnect said second optical beam therefrom, and for simultaneously generating constructively interfering beams at said first one of said optical detectors, to thereby connect said second optical beam thereto.

11. The apparatus of claim 1 wherein said first optical beam generator generates a first optical beam having a first data signal impressed thereon.

12. The apparatus of claim 1 wherein said plurality of spatial light modulators impress a first data signal on each of said first plurality of spatially modulated beams.

13. Apparatus for optically connecting a first signal to a plurality of receiving nodes comprising:
    means for converting said first signal into a first plurality of optical beams, each having said first signal encoded thereon; and
    means, responsive to said first plurality of optical beams, for generating at least two destructively interfering coherent optical beams at a first receiving node to thereby disconnect said first signal therefrom, and for simultaneously generating at least two constructively interfering coherent beams at a second receiving node to thereby connect said first signal thereto.

14. The apparatus of claim 13 wherein said generating means comprises holographic generating means.

15. The apparatus of claim 14 wherein said holographic generating means comprises a computer generated thin hologram.

16. The apparatus of claim 13 wherein said converting means comprises means for converting said first signal into a first plurality of spatially separated, spatially coherent optical beams.

17. The apparatus of claim 13 further comprising electronic controlling means, operatively connected to said converting means, for causing said converting means to generate predetermined patterns of said first plurality of optical beams, said generating means being responsive to a first predetermined pattern of said first plurality of optical beams to disconnect said first signal from said first receiving node and to connect said first signal to said second receiving node.

18. The apparatus of claim 13 wherein said generating means generates one of constructively interfering beams and destructively interfering beams at each of said plurality of receiving nodes.

19. The apparatus of claim 13 adapted for connecting a second signal to said plurality of receiving nodes, said converting means converting said second signal into a second plurality of optical beams, said generating means being responsive to said second plurality of optical beams independent of said first plurality of optical beams, for generating at least two destructively interfering beams at said second receiving node to thereby disconnect said second signal therefrom, and for simultaneously generating at least two constructively interfering beams at said first receiving node, to thereby connect said second signal thereto.

20. The apparatus of claim 13 wherein said first signal comprises a first optical beam having a first data signal impressed thereon.

21. The apparatus of claim 13 wherein said first signal comprises a first optical beam for reading an optical storage media, and wherein said plurality of receiving nodes comprise a plurality of scan lines on said optical storage media.

22. A method for optically connecting a first signal to a plurality of receiving nodes comprising the steps of:
converting said first signal into a first plurality of coherent optical beams, each having said first signal encoded thereon; and
simultaneously generating, from said first plurality of coherent optical beams, at least two destructively interfering coherent beams at a first receiving node to thereby disconnect said first signal therefrom, and at least two constructively interfering coherent beams at a second receiving node to thereby connect said first signal thereto.

23. The method of claim 22 wherein said generating step comprises the step of passing said first plurality of coherent optical beams through a hologram.

24. The method of claim 22 wherein said generating step generates one of constructively interfering beams and destructively interfering beams at each of said plurality of receiving nodes.

25. The method of claim 22 adapted for connecting a second signal to said plurality of receiving nodes, and further comprising the steps of converting said second signal into a second plurality of coherent optical beams, said generating step further comprising the step of generating at least two destructively interfering beams at said second receiving node to thereby disconnect said second signal therefrom, and for simultaneously generating at least two constructively interfering beams at said first receiving node, to thereby connect said second signal thereto.

26. Apparatus for optically connecting a first signal to a plurality of optical detectors, comprising;
a plurality of spatial light modulators, each responsive to said first signal, for simultaneously forming a first plurality of spatially modulated light beams emerging therefrom, with each of said first plurality of spatially modulated light beams emerging therefrom having said first signal encoded thereon; and
a thin hologram, positioned relative to said plurality of spatial light modulators such that said first plurality of spatially modulated light beams emerging therefrom impinge upon said thin hologram, said thin hologram being simultaneously responsive to each of said first plurality of spatially modulated light beams impinging thereon, for generating a first optical signal having said first signal encoded thereon, and for impinging said first optical signal on at least a first one of said optical detectors, with at least a second one of said optical detectors being free of said first optical signal.

27. The apparatus of claim 26 wherein each of said plurality of spatial light modulators comprise binary phase spatial light modulators.

28. The apparatus of claim 26 further comprising electronic controlling means, operatively connected to said plurality of spatial light modulators, for causing said spatial light modulators to generate predetermined patterns of said first plurality of spatially modulated beams, said thin hologram being responsive to a first predetermined pattern of said first plurality of spatially modulated beams to impinge said first optical signal on said at least a first one of said optical detectors, with at least said second one of said optical detectors being free of said first optical signal.

29. The apparatus of claim 26 wherein each of said plurality of spatial light modulators comprise transmissive spatial light modulators.

30. The apparatus of claim 26 wherein each of said plurality of spatial light modulators comprise reflective spatial light modulators, said thin hologram and said reflective spatial light modulators cooperating to form said first plurality of spatially modulated beams.

31. The apparatus of claim 26 adapted for optically connecting a second signal to said plurality of optical detectors, said plurality of spatial light modulators simultaneously forming a second plurality of spatially modulated beams from said second signal, with each of said second plurality of spatially modulated light beams incorporating said second signal, said thin hologram being responsive to said second plurality of spatially modulated beams independent of said first plurality of spatially modulated beams, for generating a second optical signal therefrom, incorporating said second signal, and for impinging said second optical signal on at least said second one of said optical detectors, with at least said first one of said optical detectors being free of said second optical signal.

32. The apparatus of claim 26 wherein said first signal comprises a first optical beam having said first signal impressed thereon.

33. The apparatus of claim 26 wherein said plurality of spatial light modulators further impress said first signal on each of said first plurality of spatially modulated light beams.

34. Apparatus for optically connecting a plurality of optical signals to a plurality of optical detectors, comprising:
an array of spatial light modulators, a respective at least two of which are positioned in the optical path of a respective one of said plurality of optical signals, for forming therefrom a predetermined wavefront; and
a thin hologram, positioned at the predetermined wavefront of each of said at least two spatial light modulators, said thin hologram connecting the associated optical signal to a predetermined optical detector in response to said predetermined wavefront from the associated at least two spatial light modulators.

35. The apparatus of claim 34 wherein said array of spatial light modulators comprise binary phase spatial light modulators.

36. The apparatus of claim 34 further comprising electronic controlling means, operatively connected to said array of spatial light modulators, for causing said spatial light modulators to generate predetermined patterns of said predetermined wavefront, to thereby connect said associated optical signal to said predetermined optical detector.

37. The apparatus of claim 34 wherein said array of spatial light modulators comprise reflective spatial light modulators, said thin hologram and said reflective spatial light modulators cooperating to form said predetermined wavefronts.

* * * * *

UNITED STATES PATENT AND TRADEMARK OFFICE
CERTIFICATE OF CORRECTION

PATENT NO. : 5,159,473
DATED : October 27, 1992
INVENTOR(S) : Feldman

It is certified that error appears in the above-identified patent and that said Letters Patent is hereby corrected as shown below:

On the title page, Item [56]

U.S. PATENT DOCUMENTS

"McManus" should be "McManus et al."

OTHER PUBLICATIONS

Second column, line 16, "225 ≥ 229" should be --225-229--.

Column 6, line 42, "180" should be --180°--.

Column 6, line 48, "With" should be --with--.

Signed and Sealed this

Fifth Day of October, 1993

Attest:

BRUCE LEHMAN

Attesting Officer

Commissioner of Patents and Trademarks